Feb. 5, 1924.  1,482,393
J. C. GLENN
ENGINE VALVE MECHANISM
Original Filed Nov. 15, 1919
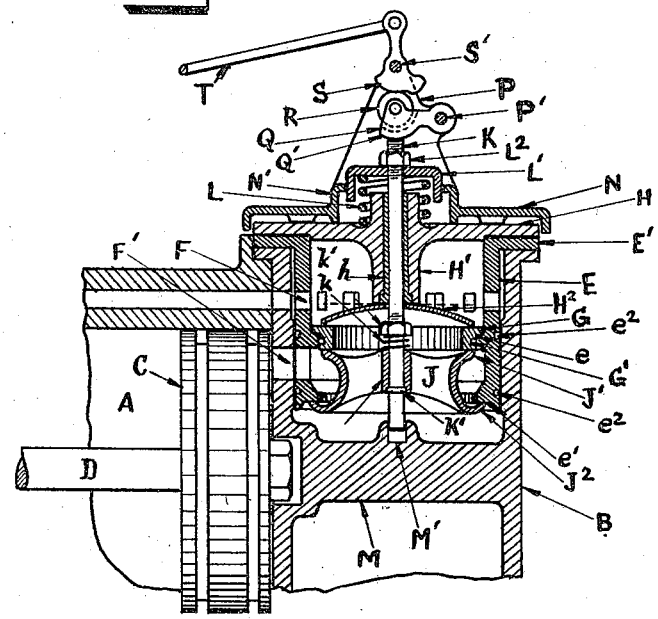
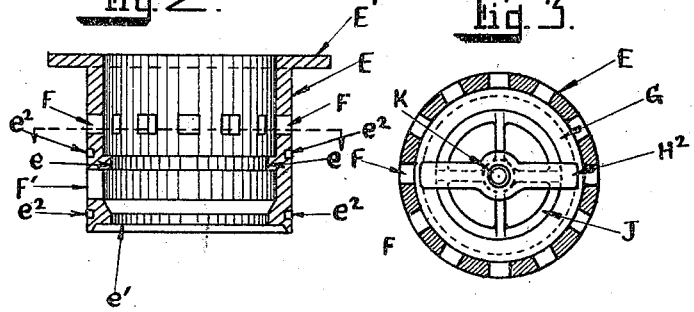
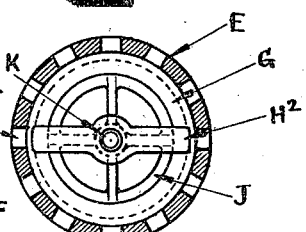
Inventor.
John C. Glenn
By JC&HMSturgeon
Attys Patented Feb. 5, 1924.

1,482,393

UNITED STATES PATENT OFFICE.

JOHN C. GLENN, OF ERIE, PENNSYLVANIA, ASSIGNOR TO SKINNER ENGINE COMPANY, OF ERIE, PENNSYLVANIA, A CORPORATION OF PENNSYLVANIA.

ENGINE-VALVE MECHANISM.

Application filed November 15, 1919, Serial No. 338,321. Renewed October 29, 1923.

*To all whom it may concern:*

Be it known that I, JOHN C. GLENN, a citizen of the United States, residing at Erie, in the county of Erie and State of Pennsylvania, have invented certain new and useful Improvements in Engine-Valve Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to engine valves, particularly to double-seat poppet valves for engines, and has for its object the providing of seats for such a valve, which are finished and the valves ground into place, and assembled before being placed in the engine; and also in providing means to compensate for the expansion and contraction of the metal of the valve, so that the seats of the valves will at all times be steam tight.

The features of my invention are hereinafter fully set forth and explained, and are illustrated in the accompanying drawings in which:

Figure 1, is a central vertical section of a fragment of an engine cylinder and head showing my invention embodied therein.

Figure 2, is a like view of one of the parts thereof.

Figure 3, is a transverse section of the part shown in Fig. 2, showing the valve in place therein on the broken section line in Fig. 2.

In these drawings A indicates an engine cylinder. B indicates a hollow steam receiving head on said cylinder. C indicates a piston in said cylinder. D indicates the piston-rod; said parts being of usual and ordinary construction. E indicates a cylindrical cage (see Fig. 2) adapted to be inserted into the valve cavity in the cylinder head B, and is provided with an annular flange E', around the upper end thereof, which fits upon the cylinder head, and is preferably ground in place thereon so as to be steam tight. This cylindrical cage E is also provided with annular shoulders $e$ and $e'$ (see Fig. 2) around the interior thereof, the lower end of which, $e'$, forms a seat for the lower side of the valve. The cage E is also provided with packing rings $e^2$, which form a steam tight joint between the cage E and the wall of the cavity therefor in the cylinder head B.

F indicates a series of ports in the wall of the cage E through which steam from the interior of the cylinder head B may flow to the valve, hereinafter described, and F' indicates the inlet port in the cage wall and cylinder head through which steam flows to the cylinder A to actuate the piston C therein.

Within the cage E and resting upon the annular shoulder $e$ therein is a ring G which is provided with a packing ring G' adapted to make the joint between the shoulder $e$ and the ring steam tight. Secured upon the upper flange E by means of bolts (not shown) is the cover H which is provided with a hollow sleeve H' in which there is a valve-stem bushing $h$; and between the lower end of the sleeve H' and the ring G is a transverse leaf spring $H^2$, the ends of which press down the ring G. J indicates a puppet valve, which has two seating surfaces J' and $J^2$. The valve J is slidably secured on a valve stem K which has an annular shoulder K' upon which the valve J rests.

Above the valve J is a spring $k$ and a nut $k'$, the nut pressing the spring down upon the valve so as to yieldingly maintain the valve J in contact with the shoulder K'; the valve stem K having the valve J thereon is inserted upwardly through the bushing $h$ in the sleeve H', on the cover (the valve stem passing through a hole in the leaf spring $H^2$ whereby said spring is held in place) until the seating surfaces J' and $J^2$ engage the lower side of the ring G, and the lower side of the annular shoulder $e'$ on the cage E, which form seats therefor. On the upper side of the cover H, I place a spring L around the upper end of the sleeve H', and upon the valve stem K, I place a cap L' which also rests upon the spring L and is secured on the valve stem by means of a nut $L^2$, so that the spring L will yieldingly lift the valve J upward against its seats, the leaf spring $H^2$ permitting the ring G to raise sufficiently to permit the seating of the surface $J^2$ of the valve against the valve seat $e'$ at the lower end of the cage E. M indicates a tie-post between the end walls of the hollow cylinder head B; and M' indicates a socket constructed on the upper side of the tie-post M in which the lower end of the valve stem K is stepped.

N indicates the base of the valve gear support secured upon the cover H, said base being provided with an up-turned annular flange N' adapted to receive the cap L'. Secured upon the base N is an upright P, at opposite sides of the flange N', and pivoted between the said uprights P upon a pin P' is an arm Q provided with a curved surface Q' which rests upon the upper end of the valve stem K.

Mounted in the free end of the arm Q is a roller R. For operating the arm Q and valve stem K I provide a cam S which is pivoted upon a pin S' in the upper ends of the uprights P; said cam being operated by a rod T extending to the governor mechanism (not shown).

In operation when the rod T is reciprocated the cam S forces the valve stem downward during one movement thereof, which lowers the valve J, and during the reverse movement permits the spring L to close the valve; and at each upward or closing movement of the valve the upper seating surface J' of the valve causes the ring G to raise sufficiently to permit the lower seating surface $J^2$ of the valve to seat against the surface e' on the cage E. When the valve is moved downward steam within the cylinder head flows through the ports F in the cage E and thence between the ring G and the upper seating surface J', and between the lower seating surface $J^2$ of the valve and the seats e' on the lower end of the cage E, to the inlet port F' of the engine cylinder.

It will be obvious from the foregoing description of my invention that by means thereof I am enabled to construct an engine valve mechanism which will at all times be steam-tight when closed, and which can, when desired, be removed together with the valve seats.

Having thus described suitable mechanism for embodying my invention so that others can construct and operate the same, I do not desire to be limited to the exact construction shown and described, as many modifications can be made therein by those skilled in the art without departing from the scope of my invention; therefore what I claim as new and desire to secure by Letters Patent is:

1. In a device of the class described, a chamber having radial steam passages through the wall thereof, an annular shoulder on the inner wall of said chamber above said steam passages, a movable valve seat ring resting on said shoulder, means to yieldingly press said ring against said shoulder, a stationary annular valve seat on the inner end of the wall of said chamber, a cover for said chamber, a double seat valve adapted to seat against said movable valve seat ring and against said stationary annular valve seat, and a valve stem slidably mounted in said cover and secured in said valve.

2. In a device of the class described, a chamber, a sleeve inserted in said chamber, an annular shoulder on the inner wall of said sleeve, steam passages through the wall of said sleeve below said annular shoulder, a valve-seat ring slidably mounted on said shoulder, a stationary valve seat on the lower end of said sleeve, a double seat ring valve adapted to seat against each of said valve seats, a cover for said valve chamber, a valve stem mounted in said cover and secured in said valve, and spring mechanism co-acting with said cover and valve-seat ring to press said ring against said valve.

In testimony whereof I affix my signature.

JOHN C. GLENN.